US009887508B2

(12) United States Patent
Stauch et al.

(10) Patent No.: US 9,887,508 B2
(45) Date of Patent: Feb. 6, 2018

(54) METHOD FOR ELECTRICALLY CONDUCTIVELY CONNECTING THE ELECTRICAL CONDUCTORS OF TWO HIGH VOLTAGE CABLES

(71) Applicant: NEXANS, Paris (FR)

(72) Inventors: Gert Stauch, Hof (DE); Peter Groetsch, Rehau (DE); Volker Markgraf, Roeslau (DE); Manfred Baesch, Oberhausen (DE)

(73) Assignee: NEXANS, Paris (FR)

( * ) Notice: Subject to any disclaimer, the term of this patent is extended or adjusted under 35 U.S.C. 154(b) by 7 days.

(21) Appl. No.: 13/923,564

(22) Filed: Jun. 21, 2013

(65) Prior Publication Data

US 2014/0000110 A1   Jan. 2, 2014

(30) Foreign Application Priority Data

Jul. 2, 2012   (EP) .................................... 12305789

(51) Int. Cl.
| | |
|---|---|
| *H01R 43/00* | (2006.01) |
| *H01R 4/30* | (2006.01) |
| *H01R 4/36* | (2006.01) |
| *H02G 15/08* | (2006.01) |
| *H01R 11/01* | (2006.01) |

(52) U.S. Cl.
CPC ............ *H01R 43/00* (2013.01); *H01R 4/305* (2013.01); *H01R 4/36* (2013.01); *H01R 11/01* (2013.01); *H02G 15/08* (2013.01); *H01R 4/308* (2013.01); *Y10T 29/49195* (2015.01)

(58) Field of Classification Search
CPC .... Y10T 29/49195; H01R 43/00; H01R 43/20

USPC .......................... 29/828, 868–873, 876, 874
See application file for complete search history.

(56) References Cited

U.S. PATENT DOCUMENTS

| | | | | |
|---|---|---|---|---|
| 2,392,438 | A  * | 1/1946 | Wade ...................... | H01R 31/00 439/709 |
| 3,499,100 | A  * | 3/1970 | O'Mara ............... | H02G 15/184 174/22 R |
| 3,828,114 | A  * | 8/1974 | Priaroggia ........... | H02G 15/068 174/142 |
| RE28,877 | E  * | 6/1976 | Pertuit ..................... | H01R 4/36 439/723 |

(Continued)

FOREIGN PATENT DOCUMENTS

WO   WO 2010097309 A1 * 9/2010

*Primary Examiner* — Peter DungBo Vo
*Assistant Examiner* — Kaying Kue
(74) *Attorney, Agent, or Firm* — Sofer & Haroun, LLP

(57) ABSTRACT

A method for electrically conductively connecting the electrical conductors (3, 4) of two high voltage cables (1, 2) is provided. The conductors (3, 4) are exposed at their ends by removing the respective casing and they are then inserted from different sides into a pipe piece (5) in such a way that they rest against each other with their end faces extending perpendicular to their axis and level with the central throughholes. The conductors (3, 4) are then secured by means of the securing screws (6) in the pipe piece 5 and bores extending in radial direction are made through the throughholes into which the two conductors (3, 4) project in the area of their end faces. Finally, the contact screws of an electrically well conductive metal are screwed into the central throughholes and further into the bores.

2 Claims, 3 Drawing Sheets

(56) References Cited

U.S. PATENT DOCUMENTS

| | | | | |
|---|---|---|---|---|
| 3,996,081 A * | 12/1976 | Nakata | H02G 1/14 | 156/48 |
| 4,238,639 A * | 12/1980 | Palmieri | H02G 15/103 | 174/73.1 |
| 4,698,458 A * | 10/1987 | Parmigiani | H02G 15/103 | 174/73.1 |
| 5,137,476 A * | 8/1992 | Noble | H01R 4/36 | 439/793 |
| 5,630,735 A * | 5/1997 | Eckert | H01R 4/30 | 439/721 |
| 5,804,767 A * | 9/1998 | Winfield | H02G 15/013 | 174/74 R |
| 5,957,733 A * | 9/1999 | Mello | H01R 4/30 | 439/810 |
| 6,280,264 B1 * | 8/2001 | Whipple | H01H 11/0031 | 335/202 |
| 6,529,112 B1 * | 3/2003 | Leone | H01R 4/36 | 337/113 |
| 6,855,012 B2 * | 2/2005 | An | H01R 4/304 | 439/793 |
| 7,537,467 B1 * | 5/2009 | Gretz | H01R 4/36 | 439/108 |
| 8,097,807 B2 * | 1/2012 | Aue | H02G 15/105 | 174/84 R |
| 8,267,730 B2 * | 9/2012 | Stauch | H01R 4/307 | 411/383 |
| 8,602,829 B2 * | 12/2013 | Kosyanchuk | H01R 4/304 | 439/813 |
| 9,270,031 B2 * | 2/2016 | Portas | H02G 15/064 | |
| 2004/0102081 A1 * | 5/2004 | Buyst | H01R 4/36 | 439/447 |
| 2010/0112873 A1 * | 5/2010 | Stauch | H01R 4/366 | 439/810 |
| 2012/0021634 A1 * | 1/2012 | Stauch | H01R 4/307 | 439/359 |

* cited by examiner (VIEW IV-IV)

(VIEW VIII-VIII)

(VIEW X-X)

METHOD FOR ELECTRICALLY CONDUCTIVELY CONNECTING THE ELECTRICAL CONDUCTORS OF TWO HIGH VOLTAGE CABLES

RELATED APPLICATION

This application claims the benefit of priority from European Patent Application No. 12 305 789.5, filed on Jul. 2, 2012, the entirety of which is incorporated by reference.

BACKGROUND

Field of the Invention

The invention relates to a method for electrically conductively connecting the electrical conductors of two high voltage cables which each include a conductor constructed as a Milliken conductor surrounded by a casing of insulating material, in which a pipe piece of metal is used which is provided over its entire length and distributed over its circumference with a plurality of throughholes provided with a thread for receiving securing screws, and approximately in its middle in a plane extending at a right angle to its axis, several central throughholes provided with a thread and offset relative to each other in the circumferential direction and provided with a thread for receiving contact screws (EP 2 226 899 A1).

Description of Related Art

As a rule, Milliken conductors are used in single conductor high voltage cables with large conductor cross sections which axe, for example, above 1,000 mm². They consist of a plurality of electrically conductive wires which are stranded together and are combined in at least three sector conductors which together form a circular conductor. Such a Milliken conductor with six sector conductors is disclosed, for example, in DE 40 36 169 C2. For reducing the skin effect, on the one hand, and the proximity effect, on the other hand, the sector conductors are insulated relative to each other. For further reducing the influence of these two effects, the individual wires of the Milliken conductor may also be insulated relative to each other, for example, by applying a varnish layer to each individual wire. For effectively electrically conductively connecting the Milliken conductors of two high voltage cables using conventional connecting elements, all insulation layers of the conductors must be removed in the area of the connecting point with great difficulty, so that as much as possible all wires of the conductor can be connected through an electrically conductive connection.

The above mentioned EP 2 226 899 A1 describes a method for electrically conductively connecting two electrical conductors which can also be used for Milliken conductors. The two conductors to be connected are introduced into a pipe piece of metal equipped with securing screws in such a way that a gap remains between the end faces of the two conductors. They are secured in this position by means of the securing screws in the pipe piece. Contact screws equipped with a rotatable, conically constructed tip are screwed into the gap between the two conductors. The tip is screwed into a respective recess of a fixing screw. As compared to the thread of the fixing screw, the top has an oppositely directed external thread. Because of the opposite threads, the tip of each fixing screw penetrates deeply into the gap between the conductors.

OBJECTS AND SUMMARY

The invention is based on the object of developing the above described method in such a way that the two Milliken conductors can be electrically effectively connected through with reduced cost.

In accordance with the invention, the object is met by initially exposing the conductors of the two cables at their ends by removing the respective casing, the two conductors are then inserted into the pipe piece from such different sides that they rest against each other on the level of the central throughholes with their end faces extending perpendicularly to their axis, the conductors are then secured in the pipe piece by means of the securing screws, bores extending in the radial direction are then produced through the central throughholes into which the two conductors of the two cables project in the area of their end faces and are constructed with a diameter which is smaller in relation to the diameter of the central throughholes, and subsequently contact screws of electrically well conductive metal are screwed into the central throughholes and further into the bores, wherein during their assembly, they cut with their thread into the two conductors.

When using this method, only the two conductors of the cables to be connected, which have been freed from the casing, have to be inserted into the pipe piece and secured therein with end faces which rest against each other. Any insulating materials present in the conductors of the two cables, such as the mutual insulation of the sector conductors and possibly any varnish layers present on the individual wires can remain. After securing the two conductors in the pipe piece by means of the securing screws, the latter rest immovably against each other with their end faces. Then bores are produced by means of a drill guided through the central throughholes which protrude radially into the pipe piece and are placed between the two conductors in such a way that they protrude as uniformly as possible into the two conductors. The contact screws, which are to be screwed as the last step into the central throughholes and further into the bores, have a diameter which is slightly larger than the inner diameters of the bores so that they cut with their threads into the two conductors. The electrically conducting connection between the conductors of the two cables is now finished. Any current to be conducted by the cables flows, if necessary, through the contact screws directly from conductor to conductor. Preferably, the contact screws consist, in dependence on the material of the conductors, or of a copper alloy or an aluminum alloy.

BRIEF DESCRIPTION OF DRAWING

The method according to the invention will be explained with the aid of the drawing as an embodiment.

In the drawing.

DETAILED DESCRIPTION

Figure 1:
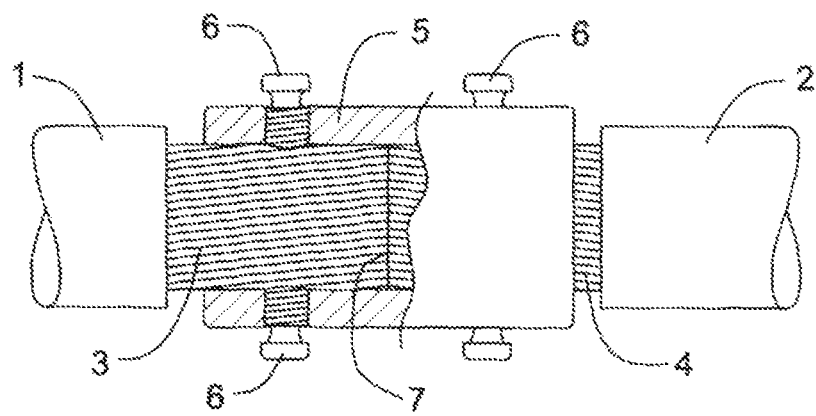
FIG. 1 schematically shows, partially in section a connecting point between two high voltage electrical cables with conductors.

FIG. 1 schematically shows a connection point between two cables 1 and 2 whose conductors 3 and 4 are located in a pipe piece 5 of metal. They are secured in the pipe piece 5 by a plurality of securing screws 6 in a position in which their end faces rest against each other in a plane 7 which extends perpendicularly to the axis of the cables 1 and 2 and of the pipe piece 5. For clarity's sake, only four securing screws 6 are illustrated in FIG. 1. In actual practice, securing screws 6 are present along the entire length of the pipe piece 5 and over the circumference thereof which are advantageously constructed as shearing off screws. The pipe piece 5, for example, consists of an aluminum alloy.

Figure 2:
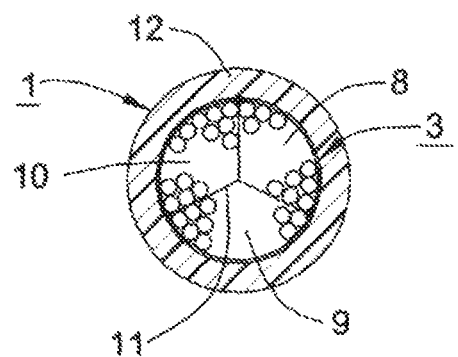
FIG. 2 is a view of the end face of the cable according to FIG. 1.

The cables 1 and 2 have a conductor constructed as a Milliken conductor. Such a conductor is shown in FIG. 2, for example, and is denoted as conductor 3 of the cable 1. The conductor 4 of the cable 2 may be of identical construction. For simplicity's sake only the construction of the conductor 3 will be explained in the following. It consists of a plurality of wires which are stranded with each other of electrically well conducting material, for example, of copper or a copper alloy. In accordance with FIG. 2, the conductor 3, for example, is divided into three sector conductors 8, 9 and 10 which each extend over an angle of 120° and together form a circular conductor 3. The conductor 3 may also have more than three sector conductors. For example, six sector conductors are used in accordance with conventional technology. A layer 11 of insulating material is provided between the sector conductors 8, 9 and 10, respectively. In addition, insulation constructed as a varnish layer, can be applied to the wires of the conductor 3. The conductor 3 is surrounded by a casing 12 of insulating material. FIG. 2 merely shows a few wires in the three sector conductors 8, 9 and 10.

Figure 9:
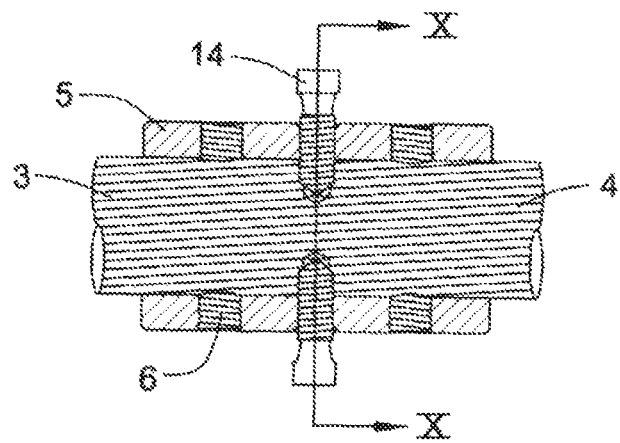
FIG. 9 shows a connecting point which is further supplemented as compared to FIG. 7.
Figure 10:
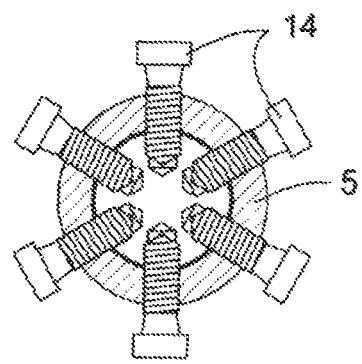
FIG. 10 is a sectional view along sectional line X-X of FIG. 9.

In addition to throughholes each provided with a thread for receiving the securing screw 6, the pipe piece 5 has central throughholes 13 provided with threads approximately in its middle on the level of the plane 7, wherein several of the central throughholes 13 are arranged distributed over the circumference in the pipe piece 5 in the plane 7. They serve for receiving contact screws 14 illustrated in FIGS. 9 and 10 which are advantageously also constructed as shearing off screws. The contact screws 14 serve for electrically conductively connecting the two conductors 3 and 4. As already mentioned, they advantageously consist of copper or a copper alloy or aluminum alloy.

For example, the method according to the invention is carried out as follows:

Initially, the conductors 3 and 4 are exposed at the ends of the cables 1 and 2 by removing the casing 12. Moreover, in the pipe piece 5 which is equipped with a plurality of securing screws 6, or has a corresponding number of throughholes which are provided with a thread, central throughholes 13 also provided with a thread are arranged. For example, in the plane 7 six central throughholes 13 which are offset relative to each other in the circumferential direction are produced in the pipe piece 5.

Figure 3:
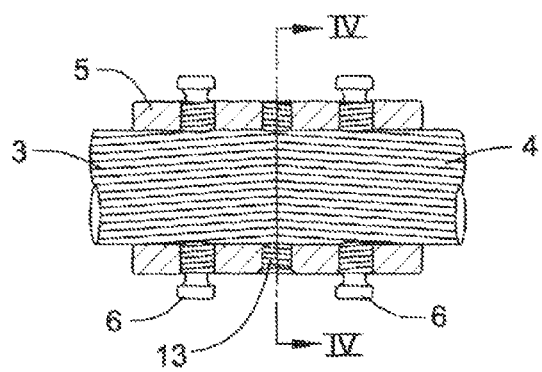
FIG. 3 shows partially in section a connecting point which is supplemented as compared to FIG. 1.
Figure 4:
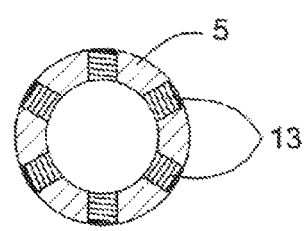
FIG. 4 is a sectional view along sectional line IV-IV of FIG. 3.
Figure 5:
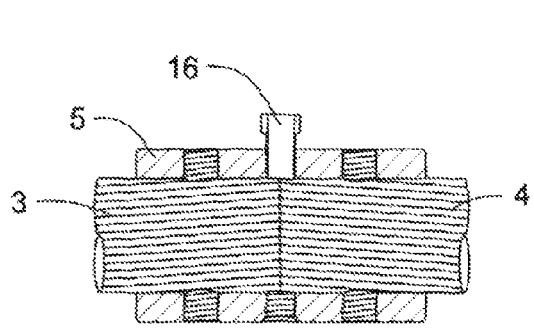
FIGS. 5 and 6 show supplements to the connecting point according to FIG. 3.
Figure 6:
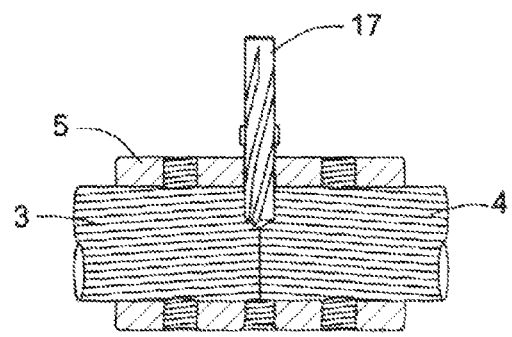

Subsequently, the conductors 3 and 4 of the two cables 1 and 2 are inserted from two opposite sides into the pipe piece 5 to such an extent that they rest against each other with their end faces in the plane 7, as illustrated in FIG. 3. In this position, the conductors 3 and 4 are secured in the pipe piece 5 by tightening the securing screw 6. The conductors 3 and 4 are freed of the casing 12 only over a length required for insertion into the pipe piece 5. Further measures are not carried out on the conductors 3 and 4. This is particularly true for all insulation materials present in the conductors.

Figure 7:
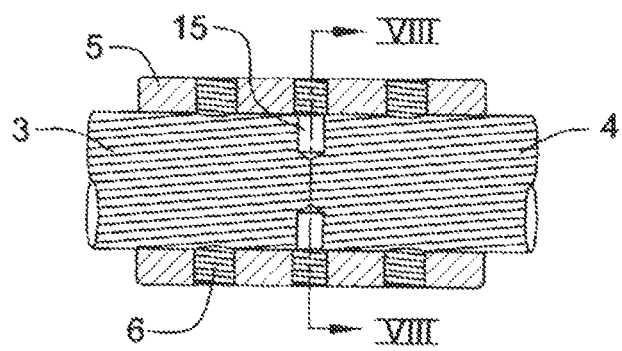
FIG. 7 is a sectional view of a supplemented component according to FIG. 3.
Figure 8:
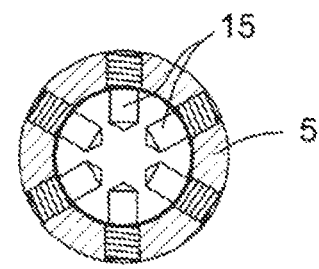
FIG. 8 is a sectional view along sectional line VIII-VIII of FIG. 7.

Subsequently, bores 15 (FIG. 7) for receiving the contact screws 14 are manufactured in the plane 7 with the central throughholes 13, wherein the bores 15 are directed radially inwardly and engage in both conductors 3 and 4. For this purpose, drill sleeves 16 are screwed into the central throughholes 13 through which a drill 17 can be guided. When using the drill sleeves 16, it is ensured in a simple manner that the threads of the central throughholes 13 are not damaged when producing the bores 15.

The drill 17 has, because of the drill sleeves 16 screwed into the central throughholes 13, a smaller diameter than the central throughholes 13, so that the bores 15 also have a smaller diameter than the central throughholes 13. The bores 15 should also have a smaller diameter than the throughholes 13 when no drill sleeves are used when drilling the holes.

When the conductors 3 and 4 are correctly positioned in the pipe piece 5, in which their end faces rest against each other on the level of the central throughholes 13, the bores 15 protect in the form of cylindrical half shells into the two conductors 3 and 4. The contact screws 14 screwed into the central throughholes 13 as the final step and further into the bores 15 have a diameter which corresponds to the diameter of the central throughholes 13. Consequently, during their assembly with the thread they additionally cut into the conductors 3 and 4 which increases the contact between the conductors 3 and 4 and the contact screws 14.

Figure 11:
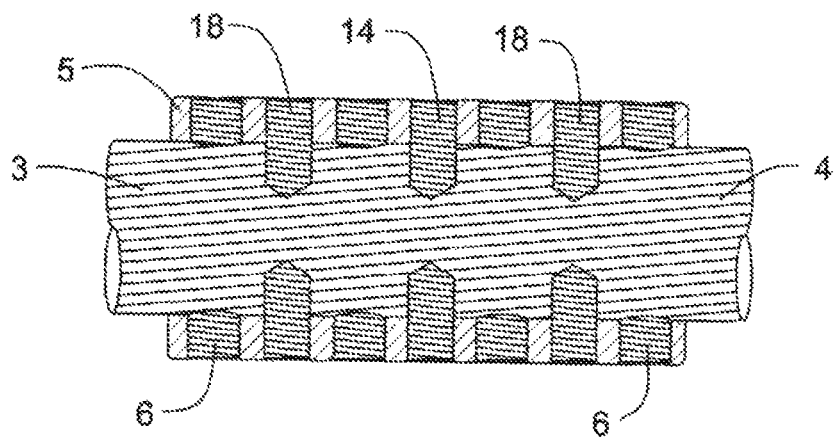
FIG. 11 is a sectional view of a connecting point further supplemented as compared to FIG. 9.

For further improving the electrically conductive connection between the two cables 1 and 2, additional throughholes provided with a thread through which additional contact screws 18 engage in the conductors 3 and 4, can be arranged in the pipe piece 5 in accordance with FIG. 11. The current can then also flow through the contact screws 18 and the pipe piece 5.

The invention claimed is:

1. Method for electrically conductively connecting two high voltage cables, each of which have a conductor constructed as a Milliken conductor and each of which are surrounded by a casing of insulating material, in which a metal pipe piece is used, the metal pipe piece having a plurality of throughholes over its entire length and distributed over its circumference, each throughhole provided with a thread for receiving securing screws, as well as approximately, in a middle of the metal pipe piece in a plane extending perpendicularly to its axis, several central throughholes each provided with thread and offset relative to each other in a circumferential direction for receiving contact screws, said method comprising the step of:

exposing conductors of the two high voltage cables at their ends by removing the respective casing;

inserting the two conductors from different sides into the metal pipe piece in such a way that they directly abut each other on the level of the central throughholes with their end faces extending perpendicularly to their axis;

securing the conductors by using the securing screws in the metal pipe piece;

producing bores in the radial direction, by drilling through the central throughholes and into an abutting area of the two conductors in the area of their end faces, said bores being constructed with a diameter which is smaller than the diameter of the central throughholes;

contact screws of electrically conductive metal are screwed into the central throughholes and further into the bores, wherein during their assembly, said contact screws cut with their threads into the two conductors.

2. Method according to claim 1, wherein additional throughholes provided with a thread are made along the length of the metal pipe piece through which additional contact screws are screwed for engaging in the two conductors.

\* \* \* \* \*